United States Patent
Jaussaud et al.

(10) Patent No.: US 10,112,330 B2
(45) Date of Patent: Oct. 30, 2018

(54) MOULD, PARTICULARLY INJECTION MOULD, AND INJECTION MOULDING METHOD USING SUCH A MOULD

(71) Applicant: SAFRAN AIRCRAFT ENGINES, Paris (FR)

(72) Inventors: Raoul Jaussaud, Moissy-Cramayel (FR); Marc-Emmanuel Techer, Moissy-Cramayel (FR); Richard Nord, Stratford, NH (US)

(73) Assignee: Safran Aircraft Engines, Paris (FR)

( * ) Notice: Subject to any disclaimer, the term of this patent is extended or adjusted under 35 U.S.C. 154(b) by 273 days.

(21) Appl. No.: 15/113,992

(22) PCT Filed: Jan. 27, 2015

(86) PCT No.: PCT/FR2015/050186
§ 371 (c)(1),
(2) Date: Jul. 25, 2016

(87) PCT Pub. No.: WO2015/114246
PCT Pub. Date: Aug. 6, 2015

(65) Prior Publication Data
US 2016/0346978 A1  Dec. 1, 2016

Related U.S. Application Data

(60) Provisional application No. 61/932,843, filed on Jan. 29, 2014.

(30) Foreign Application Priority Data

Mar. 17, 2014 (FR) ...................................... 14 52174

(51) Int. Cl.
*B29C 45/40* (2006.01)
*B29C 45/26* (2006.01)

(52) U.S. Cl.
CPC .......... *B29C 45/4005* (2013.01); *B29C 45/26* (2013.01); *B29C 2045/4015* (2013.01); *B29C 2045/4057* (2013.01)

(58) Field of Classification Search
CPC .................... B29C 2045/4057; B29C 45/4005
See application file for complete search history.

(56) References Cited

U.S. PATENT DOCUMENTS 3,871,611 A * 3/1975 Taketa .................. B29C 33/306
249/102
4,118,168 A   10/1978 Rees et al.
(Continued)

FOREIGN PATENT DOCUMENTS

DE   202011104237 U1   10/2011
DE   102011007997 A1   7/2012
(Continued)

OTHER PUBLICATIONS

International Search Report in corresponding International Application No. PCT/FR2015/050186 dated May 8, 2015 (7 pages—English Translation included).

*Primary Examiner* — Jill L Heitbrink
(74) *Attorney, Agent, or Firm* — Bookoff McAndrews, PLLC

(57) ABSTRACT

A mold (10) comprising a plurality of blocks (11, 13) that, in an assembled position, define a mold cavity, the mold being characterized in that it includes at least one pusher (21), said pusher (21) being configured to be housed in a first block (11) of said plurality, in a side facing the mold cavity, and, when the pusher (21) is housed in said first block (11), to present a first surface (S1) flush with the mold cavity, and in that the mold (10) also includes actuator means (23, 25) enabling the pusher (21) to be moved relative to the first block (11), and sealing means (19, 27) configured to isolate
(Continued)

the actuator means (23, 25) from the mold cavity. An associated molding method.

6 Claims, 2 Drawing Sheets

(56) References Cited

U.S. PATENT DOCUMENTS

| | | | |
|---|---|---|---|
| 4,963,087 A | 10/1990 | Aida et al. | |
| 5,387,096 A * | 2/1995 | Wieser | B29C 33/306 |
| | | | 249/102 |
| 5,427,520 A * | 6/1995 | Shimizu | B29C 33/44 |
| | | | 249/66.1 |
| 6,491,508 B1 | 12/2002 | Kurosawa et al. | |
| 7,008,216 B2 * | 3/2006 | Fukushima | B29C 45/263 |
| | | | 425/443 |
| 2008/0099950 A1 * | 5/2008 | Lindsten | B29C 45/4005 |
| | | | 264/159 |
| 2011/0121490 A1 | 5/2011 | He et al. | |
| 2013/0014887 A1 | 1/2013 | Jagos et al. | |
| 2013/0221574 A1 | 8/2013 | Navarra Pruna et al. | |

FOREIGN PATENT DOCUMENTS

| | | |
|---|---|---|
| FR | 2791596 A1 | 10/2000 |
| JP | S56146521 U | 11/1981 |
| JP | S61152421 A | 7/1986 |

\* cited by examiner

MOULD, PARTICULARLY INJECTION MOULD, AND INJECTION MOULDING METHOD USING SUCH A MOULD

CROSS-REFERENCE TO RELATED APPLICATIONS

This application is the U.S. national phase entry under 35 U.S.C. § 371 of International Application No. PCT/FR2015/050186, filed on Jan. 27, 2015, which claims priority to French Patent Application No. 1452174, filed on Mar. 17, 2014, and U.S. Provisional Application No. 61/932,843, filed on Jan. 29, 2014.

FIELD OF THE INVENTION

The present description relates to a mold, and more particularly to a mold made up of a plurality of blocks, in particular for injection molding, and it also relates to a molding method using a mold.

BACKGROUND

Molds are known, in particular injection molds, that are made of a plurality of blocks that define a mold cavity when they are in an assembled position. Such molds are normally used for injection molding, e.g. for injection molding turbine engine blades. The closed mold cavity defines the shape of the part to be molded. Injection is often performed at high temperature, in which case the temperature of the mold is reduced at the end of injection in order to unmold the part under good conditions without harming its properties. Nevertheless, since the part and the blocks of the mold are made of different materials (e.g. blocks made of metal and part made of carbon) differential expansion occurs that may have the effect of jamming the part in the mold.

Furthermore, when the mold cavity is opened by separating at least one block of the mold from the remainder of the mold, the part is subjected to cooling that is non-uniform as a result of the temperature difference between the air in the workshop that is in contact with a portion of the part, and the remaining block of the mold that are in contact with another portion of the part. This temperature gradient gives rise to residual stresses in the part. These residual stresses increase with increasing length of the time taken to perform unmolding. It is therefore necessary to provide special methods or appropriate tools for unjamming and extracting the part quickly from the mold.

A known solution to the problem of unmolding consists in providing a mold made up of numerous blocks, and in removing the blocks one by one until the part is completely disengaged. Such a solution is lengthy to perform and generally requires the mold to be handled (rotated, turned upside-down, tilted, etc.), and this can be found to be complex once the mold exceeds a certain size or its temperature is relatively high.

Another known solution consists in using an external tool for applying a force on the part and for separating it from the mold, e.g. wedges or a crowbar. However, the force that needs to be exerted is relatively large and such a technique often damages the molded part, in particular by leaving marks on the part.

An improvement to that problem consists in leaving a narrow through hole in a block of the mold, the through hole then connecting the mold cavity to the outside of the mold. The hole is plugged temporarily before and during molding, generally by means of a screw and a resin of the room temperature vulcanization (RTV) silicone type. At the end of injection, the mold is opened by separating at least one block of the mold from the remainder of the mold, the RTV resin is removed, and a rod is inserted in the through hole from the outside in order to exert a force on the part so as to separate it from the mold. Nevertheless, that method suffers from the above-mentioned drawbacks concerning the use of an external tool. Furthermore, the sealing provided by the RTV resin is of limited reliability and it can happen that the material injected into the mold pushes back the resin and escapes via the through hole during molding. Such a solution is thus not satisfactory. There therefore exists a need for a novel type of mold.

SUMMARY OF THE INVENTION

The object of the present invention is to remedy the above-mentioned drawbacks, at least substantially. This object is achieved by the fact that the mold comprises at least one pusher, said pusher being configured to be housed in a first block of said plurality, in a side facing the mold cavity, and to present a first surface flush with the mold cavity when the pusher is housed in said first block, and by the fact that the mold also includes actuator means enabling the pusher to be moved relative to the first block, and sealing means configured to isolate the actuator means from the mold cavity.

The term "pusher" designates a part capable of transmitting thrust. The pusher has a first surface flush with the mold cavity so that after molding it is in direct contact with the molded part. The first surface of the pusher thus matches the shape of the mold cavity, i.e. the negative of the shape of the part. The pusher is thus suitable for transmitting thrust to the part, which thrust creates a lever effect for separating the part from the mold. In order to transmit thrust, the pusher is movably mounted in the first block. In particular, the pusher is capable of being moved in one direction.

Furthermore, the first surface of the pusher may be dimensioned to be of arbitrarily large area. The larger the area of the first surface, the smaller the amount of force that needs to be applied to unjam the part from the first block.

The actuator means enable the pusher to be moved. They may be actuator means that entrain the pusher directly, or actuator means that make it easier to use external means for making the pusher move. For example, the actuator means may comprise a screw which, on being turned, causes the pusher to move. In another example, the actuator means may include a setback enabling a tool to be engaged in order to move the pusher.

In order to avoid molding material reaching the actuator means and obstructing them or making them unusable, sealing means are provided for isolating the actuator means from the mold cavity that is to receive the molding material. The actuator means are thus protected reliably throughout the molding process, in particular when the blocks are in the assembled position.

By means of the mold of the invention, unmolding can be performed simply and quickly, thus making it possible to avoid damaging the part and to minimize the residual stresses due to cooling. Furthermore, because of the sealing means, providing actuator means for the pusher has no impact on proper sealing of the mold and the mold cavity. The fabrication of parts of complete shapes, which are difficult to unmold, benefits in particular from this novel type of mold.

In certain embodiments, the sealing means are placed around the actuator means. The actuator means are thus protected from infiltration of molding material and they remain operational for unmolding.

In certain embodiments, the sealing means are provided on a surface that does not face the mold cavity. In these embodiments, the sealing means may be provided on a surface of a block that does not face the mold cavity and/or on a surface of the pusher that does not face the mold cavity. In particular, the sealing means may lie between a surface of the pusher and a surface of a block. It is thus possible to provide linear type sealing means (such as a gasket) as opposed to area type sealing means (such as a membrane), thereby diminishing any risk of rupture or leakage past the sealing means.

In certain embodiments, the actuator means are accessible from a side facing the mold cavity. Consequently, when the blocks are assembled together in the position defining the mold cavity, the actuator means are then inaccessible. This serves in particular to prevent the pusher being set into movement so long as the mold is closed, thereby guaranteeing that the shape of the mold cavity is maintained throughout molding.

In certain embodiments, the pusher includes a thread and the actuator means comprise a screw engaged in said thread. In such embodiments, the pusher can thus be caused to move in translation by turning the screw. Such actuator means are simple to fabricate and to use.

In certain embodiments, when the blocks are in the assembled position, a second surface of said pusher is in contact with a second block other than the first block. In these embodiments, this may be done in such a manner that the second block prevents the pusher from moving relative to the first block. Thus, when the blocks are in the assembled position, the pusher can be held in position by the second block. This serves to increase the reliability with which the position of the pusher is controlled.

In particular, in certain embodiments, the second surface is not parallel to the direction in which the pusher is movable, such that when the blocks of the mold are in the assembled position, the pusher is clamped between the first block and the second block.

In certain embodiments, the actuator means are accessible via said second surface of the pusher. The actuator means are thus accessible via a surface that is in contact with the second block when the blocks are in the assembled position. The actuator means are thus inaccessible so long as the first and second blocks are in the assembled position. Any untimely movement of the pusher is thus prevented, in particular while molding is taking place.

In certain embodiments, the sealing means comprise an O-ring configured to be arranged between the pusher and one of the blocks of said plurality. In particular, the O-ring may be arranged between the pusher and the first block or between the pusher and another block, in particular the second block. The use of standard components such as an O-ring makes it possible to reduce the cost of a mold in these embodiments.

The present description also relates to a method of fabricating a part by injection molding, the method being characterized in that it comprises the following steps:

providing a mold having a plurality of blocks that, when in an assembled position, define a mold cavity, the mold including at least one pusher, said pusher being housed in a first block of said plurality in a side facing the mold cavity, and presenting a first surface flush with the mold cavity, the mold also including actuator means enabling the pusher to be moved relative to the block in which it is housed, and sealing means isolating the actuator means from the mold cavity;

injecting a material into the mold cavity in order to form the part;

opening the mold cavity by separating at least one block of said plurality and other than the first block from the remainder of the mold; and actuating the actuator means to cause the pusher to move relative to the first block so that the pusher exerts a force on the part in order to separate the part from the mold.

By means of such a method, the part can be unmolded in particularly simple and quick manner, thereby serving to diminish residual stresses in the molded part and to accelerate the fabrication process using such a mold.

BRIEF DESCRIPTION OF THE DRAWINGS

The invention and its advantages can be better understood on reading the detailed description of embodiments of the invention given as non-limiting examples. The device refers to the accompanying drawings, in which.

DETAILED DESCRIPTION OF THE INVENTION

Figure 1:
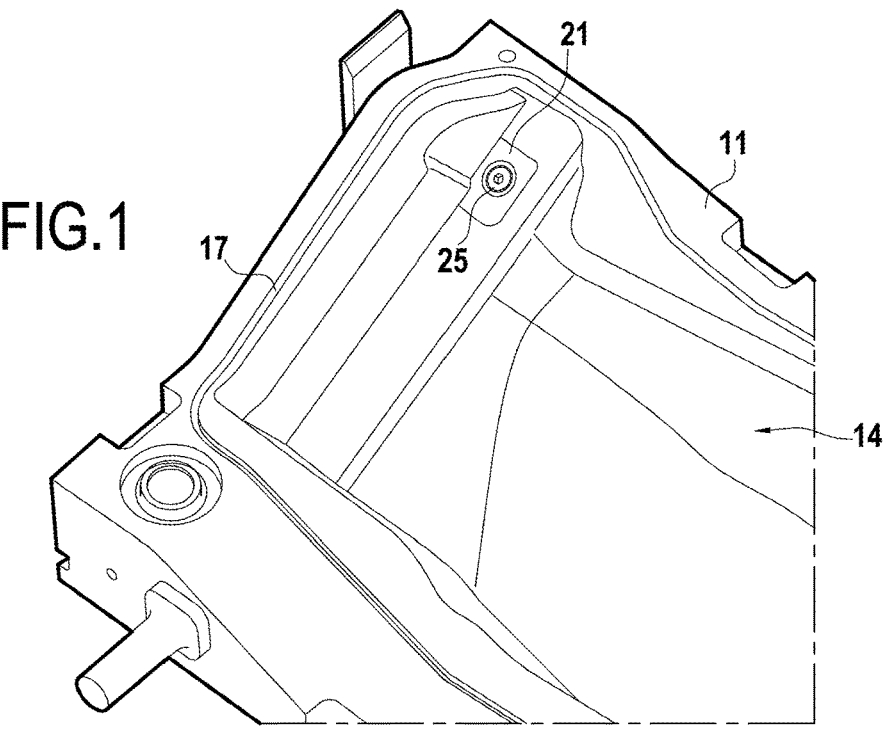
FIG. 1 is a perspective view of a first block in which a pusher is housed.

FIG. 1 is a perspective view of a first block 11 of a mold 10. In the present embodiment, the mold 10 is designed for injecting molding a turbine engine blade out of composite material. In this example, the mold 10 has two blocks 11 and 13, but it could have more. Since systems for assembling mold blocks are well known to the person skilled in the art, such a system is not described in the present description. When in the assembled position, the blocks 11 and 13 forming the mold 10 define a mold cavity 14 having the shape of the part that is to be molded (ignoring any scrap), i.e. the shape of a blade in this example.

A groove 17 is provided around the mold cavity 14 for receiving a gasket 17a. The gasket 17a is to be located between the first block 11 and the second block 13. The gasket 17a provides sealing for the mold cavity 14 when the first block 11 and the second block 13 are assembled together.

A housing 20 is provided in the first block 11 and a pusher 21 is placed therein. The pusher 21 is of a shape that is complementary to the shape of the housing 20. The pusher 21 is housed in a side facing the mold cavity 14, i.e. the pusher 21 possesses a first surface S1 inside the mold cavity 14. In addition, the first surface S1 is flush with the mold cavity 14.

The pusher 21 is movably mounted in the first block 11. More precisely, the pusher 21 is movable between a retracted position in which the pusher 21 is fully received in the housing 20 and flush with the mold cavity 14, and a partially extended position in which the pusher 21 projects relative to the mold cavity 14. For driving the pusher 21, a screw 25 is provided in a hole 22 in the pusher 21, the hole 22 having tapping 23. The hole 22 also includes a countersink (or spot face) 22a arranged beside the cavity 14 and receiving the head of the screw 25. As described in greater detail below, moving the screw 25 in rotation enables the pusher 21 to be moved away from and towards the first block 11, and in particular enables the pusher 21 to be moved in translation along the direction of the screw 25 between the retracted position and the partially-extended position.

In order to mold a part, and in particular a turbine engine blade, the first and second blocks 11 and 13 of the mold 10 are assembled together, and then molding material is injected via at least one injection orifice (not shown) of the mold 10. Particularly when injection molding a turbine engine blade, it is possible before closing the mold 10 prior to injection to insert a preform in the mold cavity 14, in particular a woven preform. At the end of injection, the still-closed mold 10 is as shown in FIG. 2, which is a fragmentary view in section of the mold 10.

Figure 2:
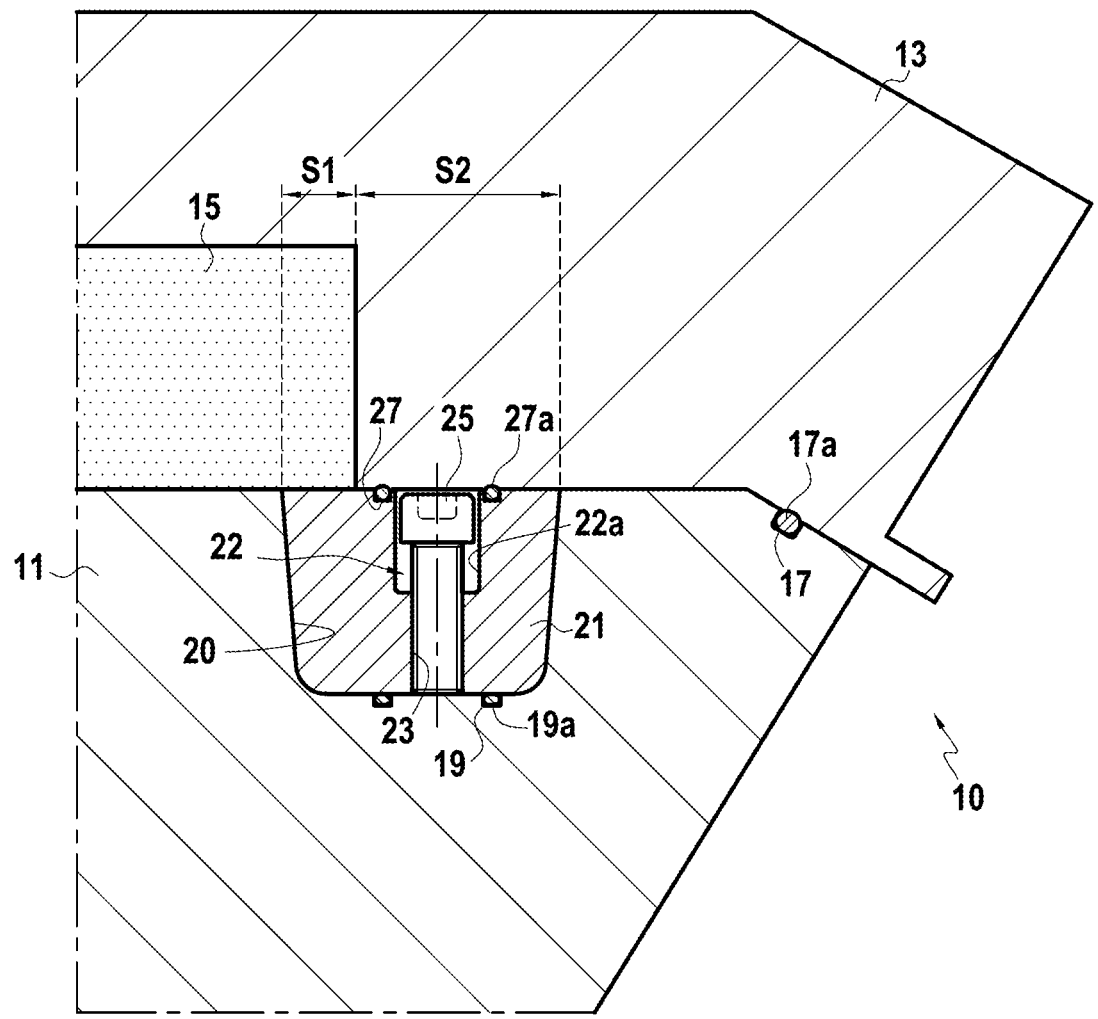
FIG. 2 is a diagrammatic section of the mold in the embodiment of FIG. 1.

In FIG. 2, the first block 11 and the second block 13 are assembled together and they define the mold cavity 14, which is now filled by the molded part 15. As mentioned above, the gasket 17a housed in the groove 17 provides sealing means for sealing the mold cavity 14 at the junction between the various blocks 11, 13 of the mold 10.

The pusher 21 is housed in the first block 11 so that the first surface S1 of the pusher 21 faces the mold cavity 14, i.e. in such a manner that the first surface S1 is in direct contact with the molded part 15. The first surface S1 is for exerting a force on the part 15 in order to separate the part 15 from the first block 11 when the pusher 21 is driven.

The pusher 21 is also housed in the first block 11 in such a manner that in the assembled position the pusher 21 has a second surface S2 in contact with a block of the mold 10 that is other than the first block 11. As can be seen in FIG. 2, in the present example, the second surface S2 is in contact with the second block 13. The second surface S2 is to prevent any movement of the pusher 21 so long as the second block 13 is assembled with the first block 11.

As mentioned above, in order to avoid molding material reaching the actuator means of the pusher 21, which it might obstruct and make unusable, sealing means are provided for isolating the actuator means 23, 25 from the mold cavity 14 that receives the molding material. The molding material could, a priori, penetrate into all of the interstices between the various portions of the mold 10; for example, when injecting epoxy resin as the molding material, the resin penetrates into all interstices of a size greater than or equal to 0.2 millimeters (mm).

Specifically, the pusher 21 is provided with a groove 27 surrounding the hole 22 on its side facing the second block 13. Specifically, the groove 27 surrounds the countersink 22a. An O-ring 27a is placed in the groove 27 to provide sealing between the mold cavity 14 and the hole 22 at the junction between the pusher 21 and the second block 13. In addition, the first block 11 is provided with a groove 19 surrounding the tapped hole 22 on its side facing the pusher 21. An O-ring 19a is placed in the groove 19 to provide sealing between the mold cavity 14 and the tapped hole 22, at the junction between the pusher 21 and the first block 11. As a result, the tapped and countersunk hole 22 is isolated at both of its ends from the mold cavity, thereby ensuring the integrity of the tapping 23 and of the screw 25. In addition, it can be seen that the sealing means 19, 27 are provided in respective surfaces that do not face the mold cavity 14.

As can be seen in FIG. 2, the means for actuating the pusher 21, in particular the head of the screw 25, are accessible via the first surface S2. Thus, so long as the second block 13 is in contact with the second surface S2, the actuator means are not accessible.

Figure 3:
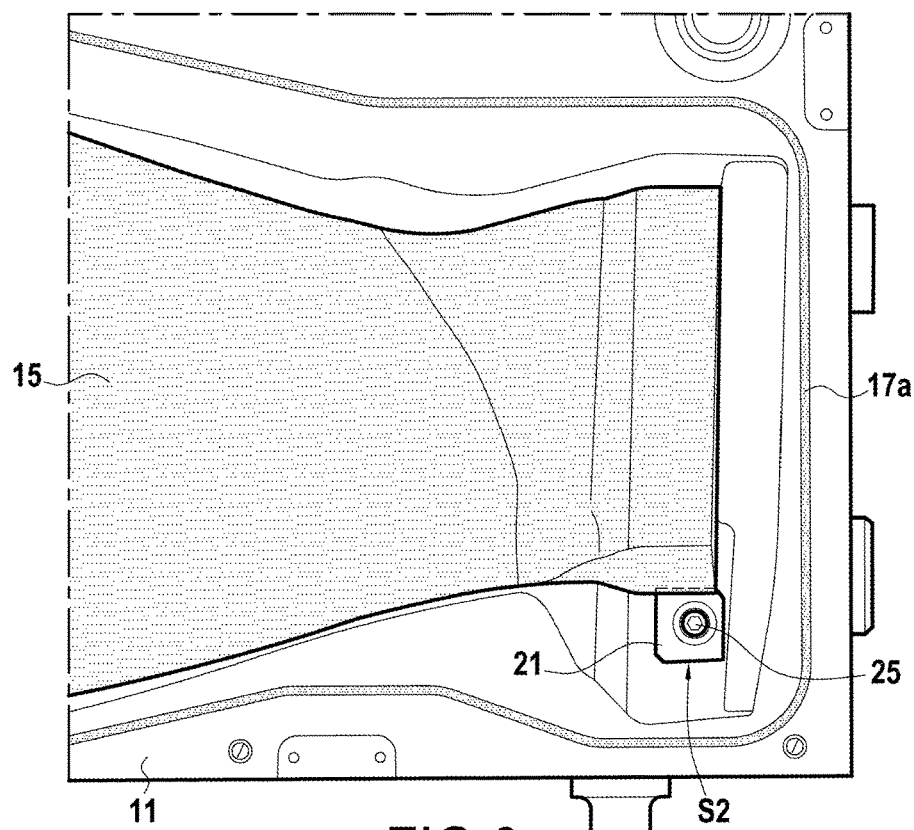
FIG. 3 is a plan view of the first block of FIG. 1, also containing a molded part.

In order to unmold the part 15, after the part 15 has cooled sufficiently, the mold 10 is opened by separating the second block 13 from the first block 11. The mold 10 and the part 15 are then in the configuration shown in FIG. 3. Because of the differential cooling between the blocks 11, 13 and the part 15, the part 15 is blocked in position in the first block 11. Since the second block 13 has been withdrawn, the second surface S2 and thus the actuator means, and in particular the head of the screw 25, are accessible once more.

In order to separate the part 15 from the first block 11, the screw 25 is turned (manually or automatically). Since movement in translation of the screw 25 is stopped by the first block 11 (see FIG. 2), turning the screw 25 acts via the tapping 23 to drive the pusher 21 in translation away from the first block 11, i.e. in a direction that exerts a force on the part 15. The pusher 21 thus makes it possible via the first surface S1 providing contact between the pusher 21 and the part 15 to exert thrust on the part 15. The screw 25 is thus turned until the part 15 becomes detached from the first block 11. The greater the area of the first surface S1, the smaller the amount of force that needs to be applied, thus making it possible to reduce any risk of marking the part 15.

With reference to the embodiment described, experience shows that the root of a blade is particularly difficult to unmold, which is why the mold 10 has a single pusher 21 placed close to the root of the blade 15. Nevertheless, it is clear that the number and the locations of the pushers can be adapted by the person skilled in the art, while nevertheless taking into consideration the need for each extra pusher in a mold block to have sealing means, e.g. O-rings, and that such sealing means constitute a potential source of failure in the molding process. It is also preferable for the number and positions of the pushers to be optimized in order to minimize the stresses induced on the part by the unmolding operation.

The use of a mold of the invention is not incompatible with other means for unmolding or for providing assistance in unmolding, e.g. applying a coating to the mold for reducing adhesion between the molded part and the walls of the cavity-forming blocks of the mold.

The actuator means are not limited to the configuration shown in FIG. 2. Numerous known means enable the pusher to be moved in a manner equivalent to that described, whether or not those means make use of a screw or a threaded rod co-operating with a tapped hole.

Although the present invention is described with reference to specific embodiments, modifications may be provided to those embodiments without going beyond the general scope of the invention as defined by the claims. In particular, the individual characteristics of the various embodiments shown and/or mentioned may be combined in additional embodiments. Consequently, the description and the drawings should be considered in an illustrative sense rather than in a restrictive sense.

The invention claimed is:

1. A mold optionally an injection mold, comprising a plurality of blocks that, in an assembled position, define a mold cavity, wherein the mold includes at least one pusher, said pusher being configured to be housed in a first block of said plurality of blocks, in a side facing the mold cavity, and to present a first surface flush with the mold cavity when the pusher is housed in said first block, wherein the mold also includes an actuator enabling the pusher to be moved relative to the first block, and a seal configured to isolate the actuator from the mold cavity, wherein, when the blocks are in the assembled position, a second surface of said pusher is in contact with a second block other than the first block, and in that the actuator is accessible via said second surface of the pusher.

2. A mold according to claim 1, wherein the seal is provided on a surface that does not face the mold cavity.

3. A mold according to claim 1, wherein the actuator is accessible from a side facing the mold cavity.

4. A mold according to claim 1, wherein the pusher includes a thread and the actuator comprises a screw engaged in said thread.

5. A mold according to claim 1, wherein the seal comprises an O-ring configured to be arranged between the pusher and one of the blocks of said plurality of blocks.

6. A method of fabricating a part by injection molding, the method comprising the following steps:
   providing a mold having a plurality of blocks that, when in an assembled position, define a mold cavity, the mold including at least one pusher, said pusher being housed in a first block of said plurality in a side facing the mold cavity, and presenting a first surface flush with the mold cavity, the mold also including an actuator enabling the pusher to be moved relative to the block in which it is housed, and a seal isolating the actuator from the mold cavity,
   wherein, when the blocks are in the assembled position, a second surface of said pusher is in contact with a second block other than the first block, and in that the actuator is accessible via said second surface of the pusher;
   injecting a material into the mold cavity in order to form the part;
   opening the mold cavity by separating at least one block of said plurality of blocks and other than the first block from the remainder of the mold; and
   actuating the actuator to cause the pusher to move relative to the first block so that the pusher exerts a force on the part in order to separate the part from the mold.

* * * * *